US006513418B1

(12) United States Patent
Simmons et al.

(10) Patent No.: US 6,513,418 B1
(45) Date of Patent: Feb. 4, 2003

(54) AIR ACTUATOR

(75) Inventors: Charles R. Simmons, Westfield, IN (US); Robert F. Elliott, Westfield, IN (US); Donald E. Foulke, Jr., Carmel, IN (US); Joshua R. Leonard, Noblesville, IN (US)

(73) Assignee: BFS Diversified Products, LLS, Carmel, IN (US)

(*) Notice: Subject to any disclaimer, the term of this patent is extended or adjusted under 35 U.S.C. 154(b) by 0 days.

(21) Appl. No.: 09/633,528

(22) Filed: Aug. 7, 2000

(51) Int. Cl.[7] .......................... B66F 3/35; B29D 22/00
(52) U.S. Cl. .......................... 92/92; 254/93 HP
(58) Field of Search .......................... 92/89, 90, 91, 92/92; 254/93 HP

(56) References Cited

U.S. PATENT DOCUMENTS

| | | | | | |
|---|---|---|---|---|---|
| 3,822,861 | A | * | 7/1974 | Scott | 254/93 HP |
| 3,982,731 | A | | 9/1976 | Tezuka | 254/93 HP |
| 4,467,484 | A | | 8/1984 | Negatake et al. | |
| 4,733,603 | A | | 3/1988 | Kukolj | 92/92 |
| 4,751,869 | A | | 6/1988 | Paynter | 92/92 |
| 4,773,519 | A | | 9/1988 | Candle et al. | 192/88 A |
| 4,819,547 | A | | 4/1989 | Kukolj | 92/261 |
| 4,948,107 | A | * | 8/1990 | Orndorff, Jr. | 254/93 HP |
| 5,015,315 | A | * | 5/1991 | Nakasaki | 156/130.7 |
| 5,067,390 | A | | 11/1991 | Negishi | 92/48 |
| 5,506,012 | A | | 4/1996 | Wright et al. | 428/35.2 |
| 5,938,179 | A | * | 8/1999 | Beukers et al. | 254/93 HP |
| 5,979,864 | A | | 11/1999 | Eggleston | |

FOREIGN PATENT DOCUMENTS

| | | |
|---|---|---|
| DE | 24 05 788 | 2/1974 |
| EP | 0 197 381 A1 | 10/1986 |
| EP | 0 626 338 A1 | 11/1999 |
| GB | 625022 | 6/1949 |

* cited by examiner

*Primary Examiner*—Edward K. Look
*Assistant Examiner*—Thomas E. Lazo
(74) *Attorney, Agent, or Firm*—John M. Vasuta; Mike Sand

(57) ABSTRACT

An air actuator adapted to be located between a pair of spaced members for moving said members with respect to each other includes a hollow body formed of an expandable non-reinforced polyurethane. The body has an ellipsoidal shape and terminates in a pair of curved closed ends and has an interior pressure cavity for receiving and discharging a pressurized fluid for expanding and contracting the body. The body is formed of at least two half members of the non-reinforced polyurethane by either a pair of longitudinal seams extending generally parallel to a longitudinal axis of the body or a single circumferential seam. An air tube connector is mounted in one of the closed ends of the body for connecting the interior cavity to a source of pressurized air.

8 Claims, 3 Drawing Sheets

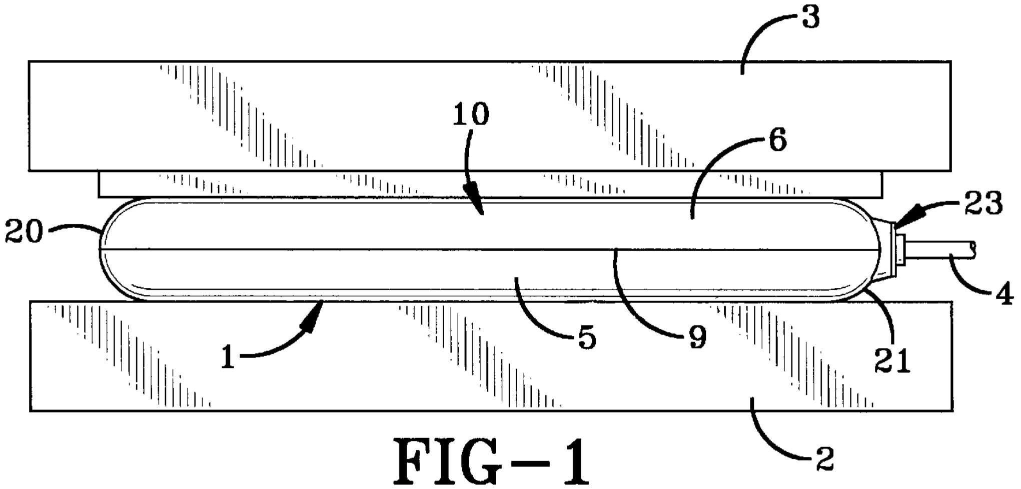
FIG-1
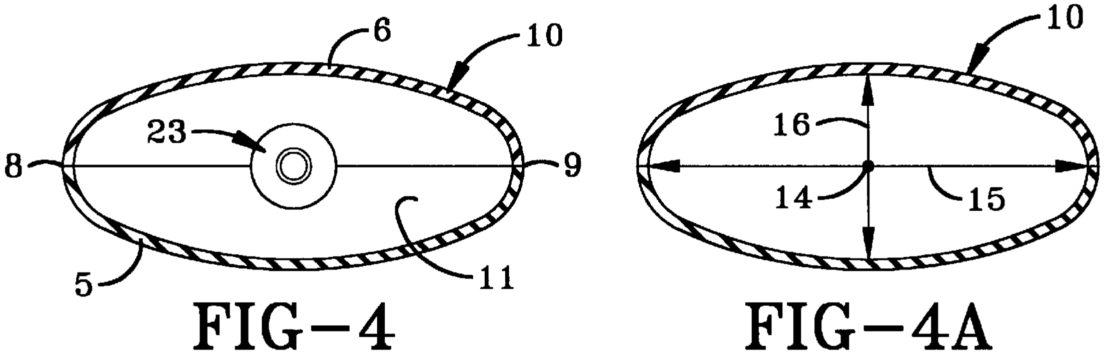
FIG-4
FIG-4A
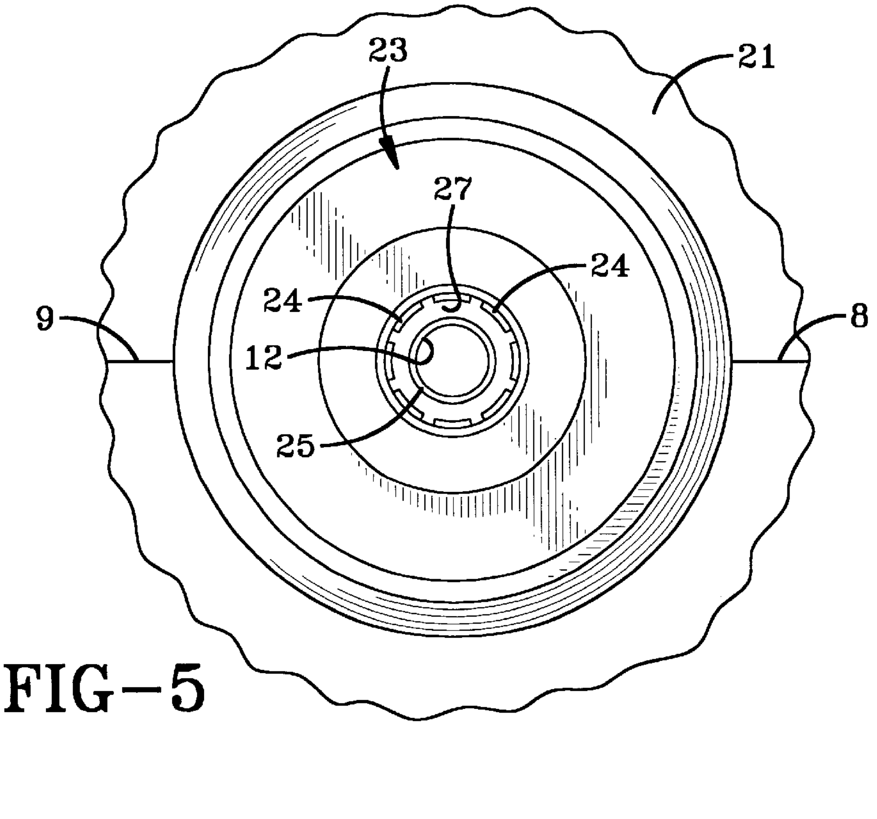
FIG-5

AIR ACTUATOR

BACKGROUND OF THE INVENTION

1. Technical Field

Invention relates generally to air actuators and more particularly to an air actuator having an elongated generally ellipsoidal shaped body formed of thin non-reinforced polyurethane sheets.

2. Background Information

Air actuators and/or air springs are well known in the art and usually comprise an elastomeric or resilient sleeve or bellows which is mounted between a pair of spaced members for maintaining the members in a predetermined spacing and/or for moving one of the members with respect to the other, or for absorbing shock exerted on one or both of the members. Air actuators move one of a pair of members by introducing a pressurized fluid, usually air, within a hollow cavity formed within the air actuator. These air actuators have various configurations and are formed of various materials, primarily a cord reinforced elastomeric material. Examples of various types of air actuators are shown in U.S. Pat. Nos. 3,982,731, 4,751,869, 4,773,519, 4,733,603, 4,819,547, and 5,506,012.

Although these prior art air actuators may be satisfactory for their intended purpose, it is desirable to be able to form an inexpensive lightweight actuator having a low profile of a relatively thin material, enabling it to expand outwardly a sufficient distance to achieve the desired movement of one of the supporting members between which it is located, not readily achievable by actuators formed of an elastomeric material, with or without reinforcing cord. Such cord reinforced construction generally increases the expense and the difficulty to produce such an actuator.

SUMMARY OF THE INVENTION

The present invention provides an air actuator having a generally elongated ellipsoidal configuration with a hollow internal cavity for receiving a pressurized fluid for expanding and contracting the actuator along its minor axis.

The air actuator of the invention is formed of at least two half members formed of sheets of a relatively thin polyurethane material which are secured together either by longitudinal welded seams, which seams extend generally parallel to the longitudinal axis of the polyurethane body, or formed of at least two elongated cup-shaped half members of thin polyurethane material by a circumferential seam.

The air actuator of the present invention includes generally rounded ends having a single air passage formed in one of the ends with an air hose connector mounted therein, preferably of the push-pull connector type, for ease of attaching an air tube therein.

Another aspect of the invention includes providing the ellipsoidal shaped polyurethane body whereby the major axis is between 1½ and 5 times greater than the minor axis to provide an elongated, relatively thin configuration thereto, enabling the body to expand outwardly a short distance in the direction along the minor axis for movement of at least one of the adjacent members.

Another feature of the invention is minimizing the number of components and difficulty of constructing the pressurized air receiving body.

A further advantage of the invention is that the polyurethane body will allow maximum operating pressures of 80 psi and is able to operate within temperature ranges of between −30° F. and +200° F., and provides an actuator body less susceptible to wear.

The foregoing advantages, construction and operation of the present invention will become readily apparent from the following description and accompanying drawings.

BRIEF DESCRIPTION OF THE DRAWINGS

FIG. 1 is a diagrammatic elevational view showing use of the air actuator of the present invention between two support members;

FIG. 4 is an enlarged sectional view taken on line 4—4, FIG. 3;

FIG. 4A is a diagrammatic view of FIG. 4 showing the major and minor axis and longitudinal axis;

FIG. 5 is an enlarged end elevational view of the actuator with a portion of the air line coupling removed therefrom;

Similar numerals refer to similar parts throughout the drawings.

DESCRIPTION OF THE PREFERRED EMBODIMENT

Figure 2:
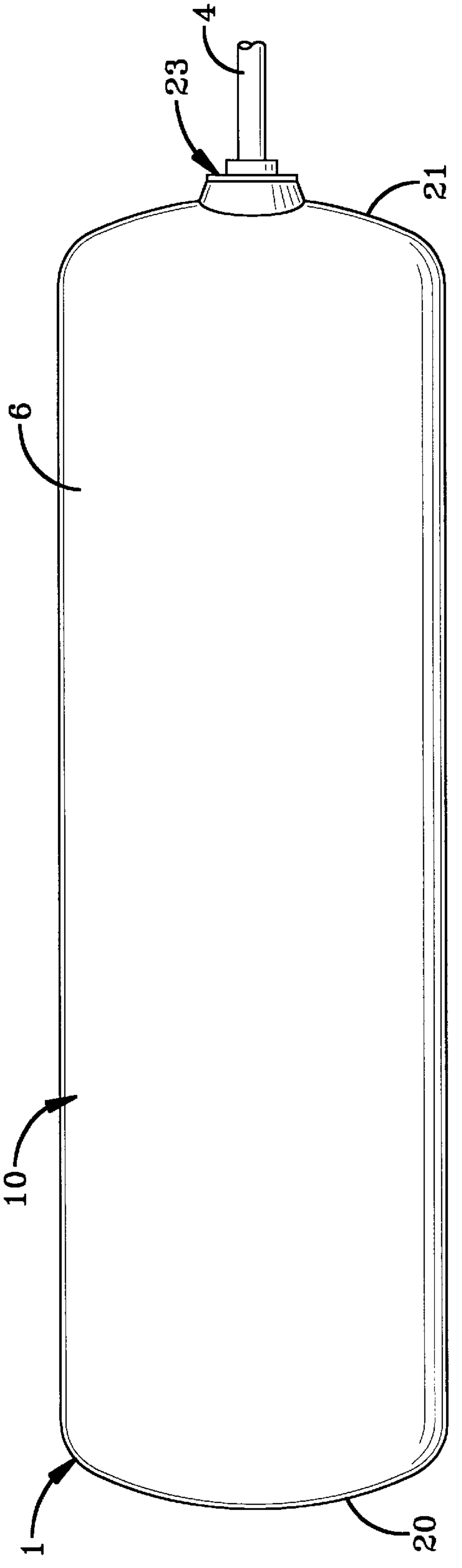
FIG. 2 is a top plan view of the actuator of FIG. 1.
Figure 3:
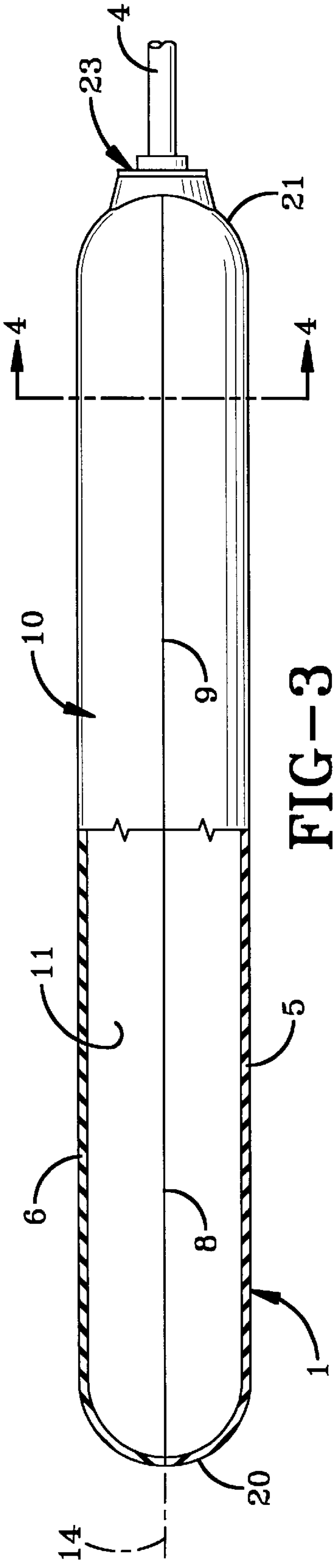
FIG. 3 is a side elevational view of the actuator shown in FIG. 2 with portions broken away and in section.
Figures 6, 7, 8:
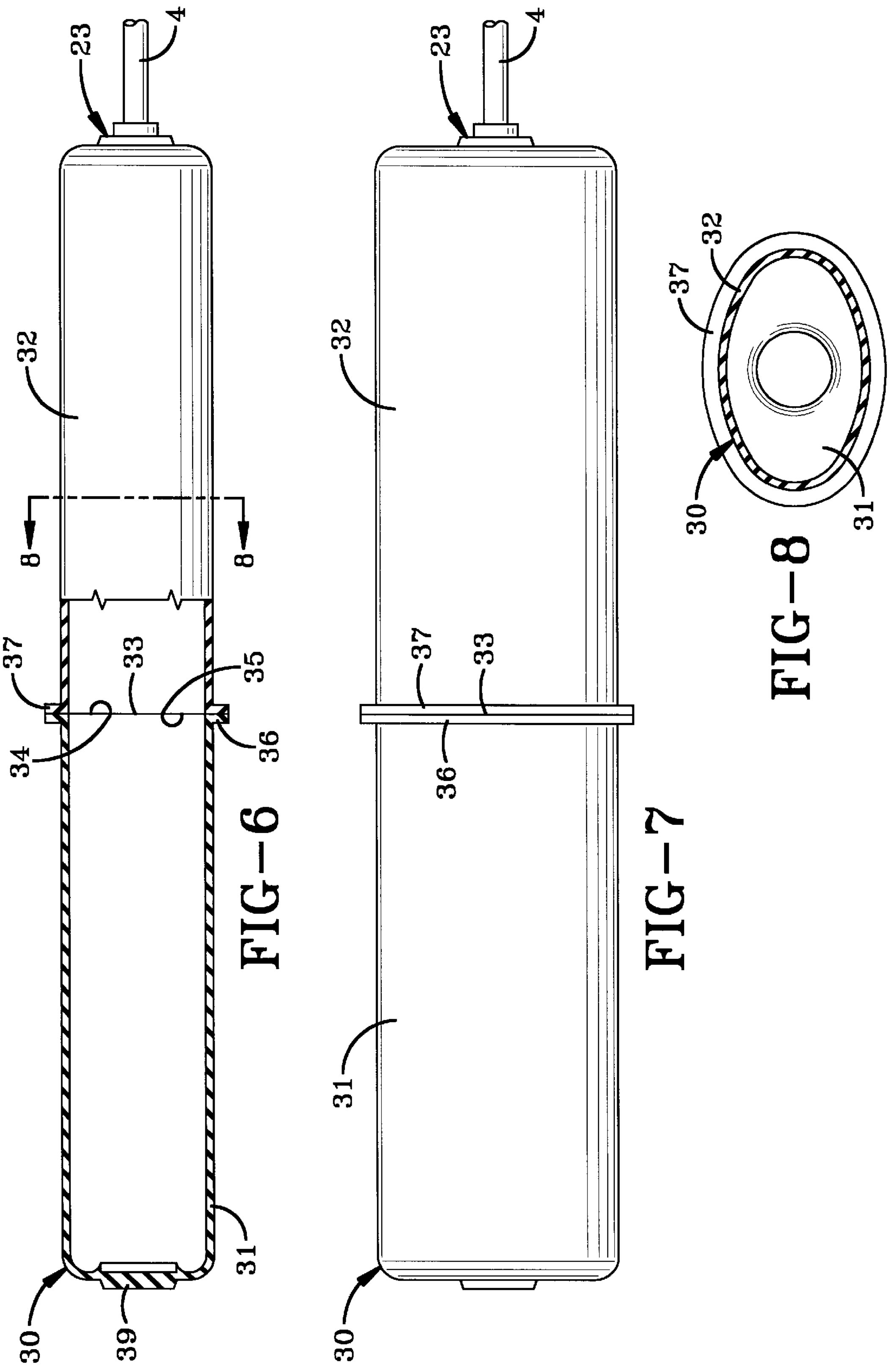
FIG. 6 is a side elevational view of a modified embodiment with portions broken away and in section.
FIG. 7 is a top plan view of the modified embodiment of FIG. 6.
FIG. 8 is a sectional view taken on line 8—8, FIG. 6.

The improved air actuator of the present invention is indicated generally at 1, and is shown in FIG. 1 mounted between a pair of spaced members 2 and 3, and in which one of the members preferably is fixed and the other member moveable by inflating and deflating actuator 1. Air actuator 1 is connected to a source of pressurized air by an air tube 4 and is formed of two half members 5 and 6 formed of sheets of a non-reinforced polyurethane material. Members 5 and 6 are joined together by longitudinal seams 8 and 9, preferably by an adhesive, thermal weld, sonic weld, or similar means of securement. Members 5 and 6 form a flexible body indicated generally at 10, having a hollow interior 11 which forms a pressurized interior cavity 11. Cavity 11 communicates with air tube 4 through an end opening 12 by which pressurized air is supplied into and out of cavity 11.

Body 10 has an ellipsoidal configuration having a central longitudinal axis 14 and, which in cross section (FIG. 4), has a major axis 15 and a minor axis 16 which remain generally constant throughout the entire longitudinal length of body 10. Major axis 15 preferably is in the range of one and one half and five times greater than minor axis 16. Body 10 terminates in a pair of curved closed ends 20 and 21 and has a fluid line connector indicated generally at 23, mounted in end 21 and form end opening 12. Connector 23 preferably is a push-pull type connector such as shown and described in pending application Ser. No. 09/173,895 filed Oct. 16, 1998, the contents of which are incorporated herein. A part of connector 23 is shown in FIG. 5 and includes a plurality of flexible circumferentially spaced gripping fingers 24 which extend about end opening 12. Opening 12 is the bore of a tube receiving sleeve 25, which together with the circularly arranged fingers 24, form an annular tube receiving space 27. However, other types of fluid openings and connectors can be utilized without affecting the concept of the invention.

The polyurethane sheets which form members 5 and 6 preferably have a wall thickness within the range of 0.050 and 0.140 inches enabling body 10 to withstand internal pressures of up to 80 psi and temperatures in the range of between −30° F. and +200° F. In the preferred embodiment, body 10 will have a longitudinal length of 12 inches and a maximum radial width defined by minor axis 16, of 5 inches.

A modified form of the air actuator is indicated generally at 30, and is similar in most aspects to that of actuator 1 except it is formed of two elongated cup-like half members 31 and 32 which are joined together by a circumferential seam 33. Each of the half members 31 and 32 terminate in open ends 34 and 35 respectively, each of which are defined by an annular outwardly extending flange 36 and 37, respectively, which are secured together by welded seam 33. Half members 31 and 32 are formed of the same non-reinforced polyurethane sheet material described above for actuator land will provide a similar ellipsoidal configuration as that of body 10. The closed end of half member 32 will be provided with connector 23 with the closed end of half member 32 having a thickened end wall portion 39 to increase the strength of the actuator.

Accordingly, the improved air actuator is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the air actuator is constructed and used, the characteristics of the construction, and the advantageous new and useful results obtained; the new and useful structures, devices, elements, arrangements, parts, and combinations are set forth in the appended claims.

What is claimed is:

1. An air actuator comprising:

a hollow body forming an interior pressure cavity, said body having an elongated generally ellipsoidal shape extending over substantially an entire longitudinal length, said body having in cross section major and minor axii, and formed of a least two thin non-reinforced polyurethane half members joined together by at least one seam, and terminating in two closed ends; and a fluid connector formed in a least one of said ends for passage of fluid into and out of the interior cavity for expanding and contracting the body outwardly and inwardly along the minor axis by passage of a fluid into and out of said interior cavity, said fluid connector including a plurality of flexible circumferentially arranged gripping fingers forming a circular opening adapted to engage a tube inserted into said opening.

2. The air actuator defined in claim 1 in which the major axis is in the range of 1½ and 5 times greater than the minor axis.

3. The air actuator defined in claim 1 in which the interior cavity contains a pressurized fluid having a maximum pressure of about 80 psi.

4. The air actuator defined in claim 1 in which the half members are two sheets of polyurethane and are joined by an adhesive to form a pair of longitudinal seams.

5. The air actuator defined in claim 4 in which the body contains only two longitudinal seams which lie in a plane common with the longitudinal axis of said body.

6. The air actuator defined in claim 1 in which the half members are polyurethane sheets having a thickness within the range of 0.050 and 0.140 inches.

7. The air actuator defined in claim 1 in which the body has a longitudinal length of 12 inches and a maximum width defined by the minor axis of 5 inches.

8. The air actuator defined in claim 1 in which the seam is a heat weld.

* * * * *